May 5, 1970 J. TOULEMONDE 3,510,687
CONTROL ARRANGEMENT FOR SERIES CONNECTED THYRISTORS
Filed Aug. 23, 1967 4 Sheets-Sheet 1

May 5, 1970     J. TOULEMONDE     3,510,687

CONTROL ARRANGEMENT FOR SERIES CONNECTED THYRISTORS

Filed Aug. 23, 1967     4 Sheets-Sheet 4

United States Patent Office 3,510,687
Patented May 5, 1970

3,510,687
CONTROL ARRANGEMENT FOR SERIES CONNECTED THYRISTORS
Jacques Toulemonde, Versailles, France, assignor to Compagnie Generale d'Electricite, Paris, France, a French corporation
Filed Aug. 23, 1967, Ser. No. 662,820
Claims priority, application France, Aug. 23, 1966, 73,891
Int. Cl. H03k 17/00
U.S. Cl. 307—252
6 Claims

ABSTRACT OF THE DISCLOSURE

A device for switching on a chain of sections in series each section comprising at least one thyristor, each of the said sections being associated with an individual excitation transformer, the primary windings of each of the said transformers except the first being connected to the secondary winding of the preceding transformer and the excitation being controlled by the application of an oscillatory signal supplied by a generator to the primary winding of the first transformer; in which device the generator is controlled by a control source of impulses and the oscillatory signal issuing from the generator and transmitted by the transformers is a signal at an oscillatory frequency determined by the generator and sustained for a period equal to the duration of each impulse received from the control source, means being provided for rectifying the oscillatory signal before it is applied to each section of the chain.

---

The invention relates to a device for controlling thyristors which are arranged in series.

It is known to arrange semi-conductive elements, such as thyristors, in series and to use chains of series connected capacitors and resistors for distributing the voltage across the said thyristors.

Frequently a single generator energizing an excitation transformer is used for controlling such a chain of thyristors, the said transformer having as many secondary windings as there are rectifying elements (thyristors) to be controlled. Such secondary windings can be subjected to high voltages, and the insulation required is accordingly considerable. The pulses applied by the generator should have a short rise time in order to insure that the thyristors are switched on simultaneously; it is necessary, moreover, for the delay which can occur between the application of the control signal to the first and the last thyristor of the chain to be so small that all the thyristors are switched on within a period of approximately 0.1 microsecond.

When a large number of thyristors in series is used, in particular for applications relative to the transmission of electrical energy through a high voltage D.C. line, it becomes necessary to split up the chain formed by $n$ thyristors into a certain number of serially connected sections $p$ on, each comprising $m$ thyristors in series, with the result that one has $m \times p = n$ thyristors. The switching off of each of these sections can be carried out as indicated above, by controlling the thyristor in each section which has the lowest voltage, the $p$ thyristors sections being controlled simultaneously.

The insulation of the devices for switching on a chain of thyristors supplied between the ends of the chain with high voltage between tens of thousands of volts and some hundreds of thousands of volts, presents difficulties, as the insulation required in relation to earth must be adequate to withstand voltages of the order of a million volts.

In applications requiring the arrangement of thyristors in series, the tendency is to use bridge rectifier assemblies for converting to D.C. energy, the bridge assemblies generally being supplied from energy sources with, for instance, frequencies of 50 c./s. or 60 c./s. In order to have the bridges operate satisfactorily, it is necessary to apply to the gates pulses of comparatively long duration, which may in certain cases be some milliseconds.

If the bridges have only one thyristor per bridge arm, the ascending and descending faces of these pulses can be comparatively long in relation to the period of the network, i.e. they can have ascending or descending times of approximately 50 microseconds. This represents an angular deviation having very poor control over the operation of the thyristors. On the other hand, when each arm of the bridge has several thyristors in series, the said times, having regard to the differences in the control characteristics of the thyristors comprising the chain are incompatible with the necessity for a simultaneous switching on of the chain.

In accordance with the present invention there is provided a device for switching on a chain of sections in series, each section comprising at least one thyristor, each of the said sections being associated with an individual excitation transformer, the primary windings of each of the said transformers being connected to the secondary winding of the preceding transformer and the excitation being controlled by the application of an oscillatory signal supplied by a generator to the primary winding of the first transformer, in which device the generator is controlled by a control source of impulses and the oscillatory signal issuing from the generator and transmitted by the transformers is a signal at an oscillatory frequency determined by the generator and sustained for a period equal to the duration of each impulse received from the control source means being provided for rectifying the oscillatory signal before it is applied to each section of the chain.

With the device of the invention it is possible to solve the problem of the simultaneous switching on of a chain of $p$ thyristors. The generator insures that the face or front of the pulse has the necessary steepness, and the control source supplies control in pulses the sequence of which is determined as a function of a predetermined program.

In the preferred embodiment, the signal issuing from the generator is applied to the thyristor of the chain having the lowest voltage and, via a first transformer, to the second transistor of the chain series, with a second transformer connected in parallel supplying the control of the third thyristor of the chain and so on up to the $p$ th thyristor of the chain, the signal supplied by the generator being applied to the terminals of the control junction of a thyristor after detection of the said signal.

The generator may be supplied from a source of electrical energy via a device with very high insulation in relation to earth, such as for instance a transformer. The various transformers transmitting the signal of the generator to the second, third, $p$ th thyristor have then to carry only the voltage corresponding to the voltage at the terminals of one thyristor between the primary and secondary windings.

The invention is also applicable to the case of a chain or column comprising $n$ thyristors in series, the said column being constituted of $p$ sections in series each comprising $m$ thyristors (obviously $m \times p = n$) in series, each thyristor of a section is connected in parallel with an RC circuit and with one resistor of a first voltage divider constituted of resistors of equal value in series and in number equal to the number of thyristors, and the switching on signal is applied via a detector to the gate of the thyristor at the lowest voltage of the said section; a second voltage divider constituted of resistors of equal value in series and in number equal in value to the number of resistors of said first voltage divider is connected in parallel to said series of thyristors, impedance means including a Zener diode interconnecting the common points of two adjacent resistors of said first and second voltage dividers. In this case, accordingly the p thyristors at the lowest voltage of the p sections have to be switched on, the insulation between the primary and secondary winding of each transformer only having to be sufficient to withstand the voltage at the terminals of a section.

It is also possible to arrange on each transformer, in addition to the secondary winding supply the primary of the following transformer, $m-1$ auxiliary secondary windings each connected to control terminals of one of the $m$ thyristors of a section, the thyristor with the lowest voltage in the section being supplied by the primary winding of the transformer, as above. The frequency of the signal supplied by the generator is preferably high and is advantageously between 3M c./s. and 50M c./s., the signal emitted by the control source of impulses unblocking an oscillator of the generator above a certain threshold value, in such a way that the switching on signals of the thyristors, supplied by the generator, are applied to all the thyristors in the very short time, which is acceptable, taking into account delays introduced by the dephasings of the various transformers. The said dephasings can be fixed at a value such that the delay between the signal at the output of the generator and the signal at the terminals of the secondary winding of the last transformer is at the most equal to the said very short time. Finally, the generator supplies a high oscillatory signal for a certain time, determined by the duration of the impulse supplied by the control source, which source can be connected to the generator by a pulse transformer having a very high insulation in relation to earth or by luminous radiation or electromagnetic radiation, in which latter case the said source will be located at a certain distance from the generator and will not then require special insulation precautions other than those necessary for its own functioning.

The said control source serves as pilot for the generator and receives information necessary for the functioning of the chain or column of thyristors simultaneously with other sources piloting other generators other chains or columns, as is the case of bridge assemblies carried out by means of such chains or columns. It should be clear that such bridges can function as bridges or in any other way where multiple controlled rectification in accordance with a strict sequence is required and their functioning is determined by the period and duration of the impulses emitted by the control source.

The invention will now be described in more detail by way of examples with reference to the accompanying drawings.

Figure 1:
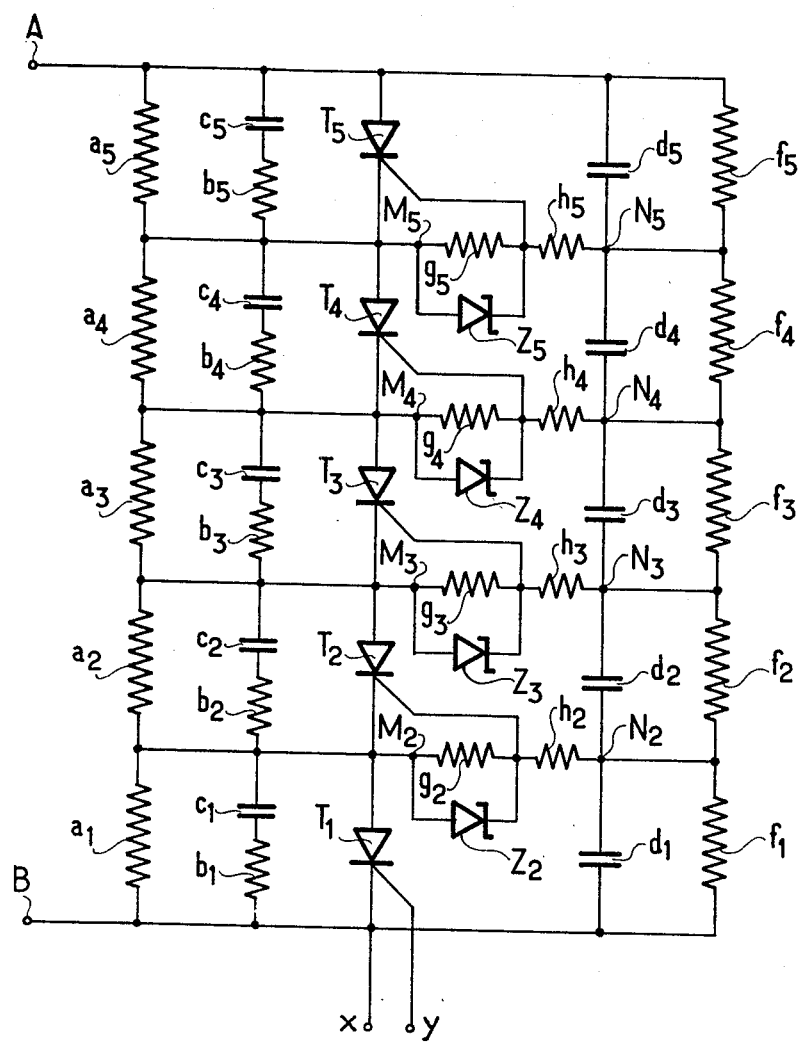
FIG. 1 shows a type of assembly of a chain of thyristors in series.

FIG. 1 shows an assembly containing a chain of thyistors T in series, said chain being constituted of five thyristor elements $T_1$, $T_2$, $T_3$, $T_4$, $T_5$. The number of thyristors chosen has been restricted to five simply to provide for a simplified description of the principles of the invention. This chain is connected at its ends to the terminals A and B to which is connected an alternating voltage V which the thryistors must be capable of blocking.

The thyristors are connected respectively to the terminals of five resistors of equal value in series, $a_1$, $a_2$, $a_3$, $a_4$, $a_5$, which constitute a voltage divider. The thyristors are also connected respectively to the terminals of five RC circuits in series, constituted by the resistors $b_1$, $b_2$, $b_3$, $b_4$, $b_5$, and by capacitors $c_1$, $c_2$, $c_3$, $c_4$, $c_5$. A second voltage divider is also connected at its ends to the terminals A and B and is constituted in an analogous way of five resistors in series $f_1$, $f_2$, $f_3$, $f_4$, $f_5$, of equal value. Capacitors in series $d_1$, $d_2$, $d_3$, $d_4$, $d_5$, having the same capacity are connected respectively to the terminals of the resistors of the second voltage divider in order to permit the passing of high frequency variations in voltage.

The points common to two adjacent resistors of the first voltage divider are connected respectively to terminals $M_2$, $M_3$, $M_4$, $M_5$. Parallel to this arrangement, the common points of two adjacent resistors of the second voltage divider are connected respectively to the terminals $N_2$, $N_3$, $N_4$, $N_5$. Voltage dividers constituted of two resistors in series $g_2$ and $h_2$, $g_3$ and $h_3$, $g_4$ and $h_4$, $g_5$ and $h_5$, are connected respectively between the terminals $M_2$ and $N_2$, $M_3$ and $N_3$, $M_4$ and $N_4$, $M_5$ and $N_5$. The points common to the two resistors of these voltage dividers are connected respectively to the gates of the thyristors $T_2$, $T_3$, $T_4$, $T_5$. On the other hand, Zener diodes $Z_2$, $Z_3$, $Z_4$, $Z_5$ are connected respectively across the terminals of the resistors $g_2$, $g_3$, $g_4$, $g_5$. The switching on the unit takes place by means of a control signal applied to the terminals $x$ and $y$ of the cathode gate circuit of the thyristor $T_1$ which is at the lowest voltage.

Figure 2:
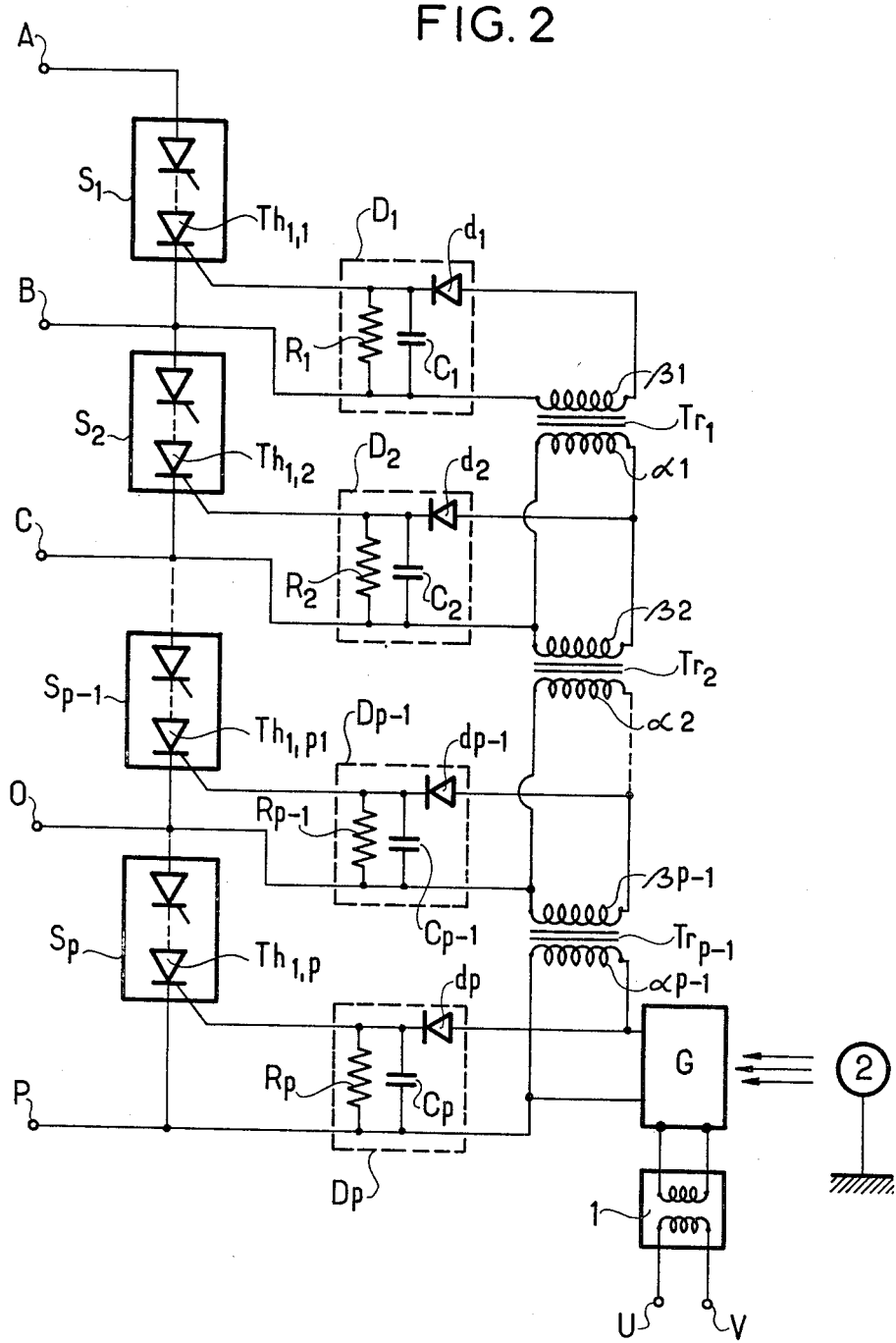
FIG. 2 shows the circuitry of the control device in accordance with the invention applied to the switching on of a column constituted of $p$ identical sections, each having the circuit of FIG. 1.

FIG. 2 shows diagrammatically the control device for switching on a column constituted of $p$ identical sections $S_1$, $S_2$ . . . $S_p$, the circuit arrangement of each of which is similar to that shown in FIG. 1, but each has $m$ thyristors in series. The thyristors $Th_{1,2}$, $Th_{1,2}$ . . . $Th_{1,(p-1)}$, $Th_{1,p}$, are respectively, in each of the sections $S_1$, $S_2$ . . . $S_p$, the thyristors at the lowest voltage, their position in each section corresponding to that of the thyristor $T_1$ in FIG. 1. The signal supplied by a generator G is applied on to the control circuit of the thyristor $Th_{1,p}$ via a detection device $D_p$ and also to a primary winding $\alpha_{p-1}$ of a transformer $Tr_{p-1}$, whose secondary winding $\beta_{p-1}$ supplies the control circuit of the thyristor $Th_{1,p1}$ via a detection device $D_{p-1}$ and a primary winding $\alpha_2$ of a transformer $Tr_2$, and so on. Finally, the secondary winding $\beta_1$ of the transformer $Tr_1$ supplies a control circuit of the thyristor $Th_{1,1}$ via a detection device $D_1$.

The generator G is supplied for instance from an alternating current supply network having terminals U, V by means of a transformer 1 whose insulation with respect to earth is very high and satisfies the electrical requirements of the column formed by the sections $S_1$, $S_2$ . . . $S_p$, itself supplied with high voltage between the terminals A and P.

The generator G is controlled by a control source 2 which emits, for instance, a luminous radiation, the distance between the generator and the source 2 being sufficiently great for there to be no problem of insulation of the source 2 with respect to earth.

The luminous signal emitted by the source 2 initiates the functioning of the generator G to produce a sinusoidal signal, whose frequency is 10M c./s. for instance, which gives a duration of $0.1\mu$ second for 1 cycle. If it is desired that the signal issuing from the generator should open all the thyristors $Th_{1,1}$, $Th_{1,2}$ . . . $Th_{1,p}$, within a period equal to $0.1\mu$ second, for instance, the dephasings introduced by the $p1$ transformers $Tr_1$ . . . $Tr_{p-1}$ should not bring about a delay greater than $0.1\mu$ second. This delay of $0.1\mu$ second is equal to a dephasing of 360°, for a frequency of 10M c./s.; if the column is formed of 11 sections, there are 10 transformers which gives a maximum dephasing of 36° per transformer. It is not difficult to produce transformers having lower dephasing than this, which makes it possible, by suitable choice of the signal frequency supplied by the generator, to obtain the opening of any number of sections with a delay less than a given limit, for instance $0.1\mu$ second. It is accordingly possible to apply the opening signal to all the thyristors within a very short period, which is an essential condition for the good functioning of a chain in series or of a column.

Figure 3A:
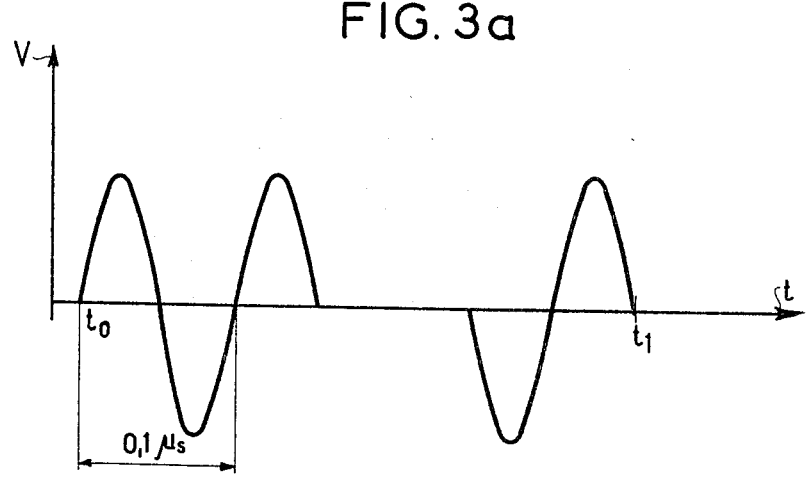
FIG. 3a is a diagram of the high frequency signal supplied by the generator G of FIG. 2.
Figure 3B:
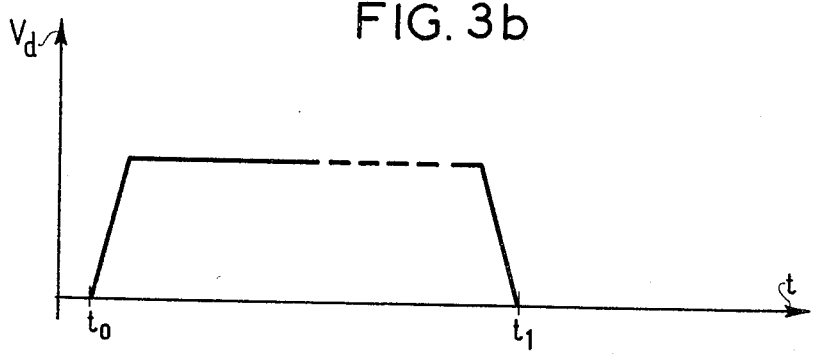
FIG. 3b is the diagram of the signal applied to the terminals of the control junction of the thyristor $Th_1$, $p$ of FIG. 2 after detection.
Figure 3C:
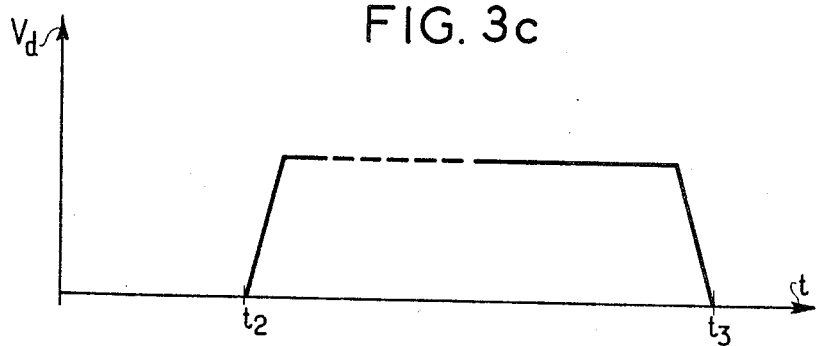
FIG. 3c is the diagram of the signal applied to the terminals of the control junction of thyristors $Th_1$, 1 of FIG. 3 after detection.

The detection devices $D_1, D_2 \ldots D_p$, which are all identical to each other, each have a diode $d_1, d_2 \ldots d_p$ in series with the control electrode (trigger or gate) of the corresponding thyristor, a capacitor $C_1, C_2 \ldots C_p$, and a resistor $R_1, R_2 \ldots R_p$ combination connected in parallel with the control junction. The high frequency signal supplied by the generator is accordingly converted into a direct voltage signal supplied to the control junction of the thyristors; this direct voltage signal has a duration equal to that of the emission of the source of radiation 2, i.e., for instance a few milliseconds; with the emission of the source 2 taking place 50 times per second if the column is supplied, as is generally the case, from an alternating network at 50 c./s. Control signals are supplied to the gates at the rate of 50 per second, which means that 50 pulses per second are passed to the said electrode. FIG. 3a is a diagram showing the high frequency signal, 10M c./s. for instance, supplied by the generator G of FIG. 3, from time $t_0$ to time $t_1$, i.e. for a duration $t_1-t_0$ equal to a few milliseconds for instance. FIG. 3b is a diagram of the corresponding signal applied at the terminals of the control junction of the thyristor $Th_{1,p}$ after detection. FIG. 3c is a diagram of a corresponding signal applied to the terminals of the control junction of the thyristor $Th_{1,1}$ after detection, this signal being applied during the time $t_2-t_3$ equal to $t_1-t_0$, but with a delay of $t_2-t_0$ equal to $0.1\mu$ second, due to dephasing introduced by the transformers $Tr_1, Tr_2 \ldots Tr_{p-1}$.

The capacitors and resistors $R_1C_1, R_2, C_2 \ldots R_p, C_p$, of the detection devices $D_1, D_2 \ldots D_p$, illustrated in FIG. 2 can be constituted of components arranged in parallel with the control junction; they can also be constituted by the capacitance and the resistance of each control junction itself; this depends in actual fact on the characteristics of the thyristors employed and on the frequency of the signal supplied by the generator G.

The transformers $Tr_1, Tr_2 \ldots Tr_{p-1}$, should have sufficient insulation to withstand a voltage between secondary and primary windings, i.e., between $\beta_1$ and $\alpha_1$, $B_2$ and $\alpha_2 \ldots \beta_{p-1}$ and $\alpha_{p-1}$, equal to the voltage at the terminals of the sections $S_1, S_2 \ldots S_p$, being equal to each other. Accordingly the insulation voltage between $\beta_1$ and $\alpha_1$ is equal to the voltage between the points B and C between, respectively, the sections $S_1$ and $S_2$, $S_2$ and $S_3$; in the same way the insulation voltage between $\beta_{p-1}$ and $\alpha_{p-1}$ is equal to the voltage between the points O and P, the point O being between the sections $S_{p-1}$ and $S_p$, the point P being one of the supply terminals.

Figure 4:
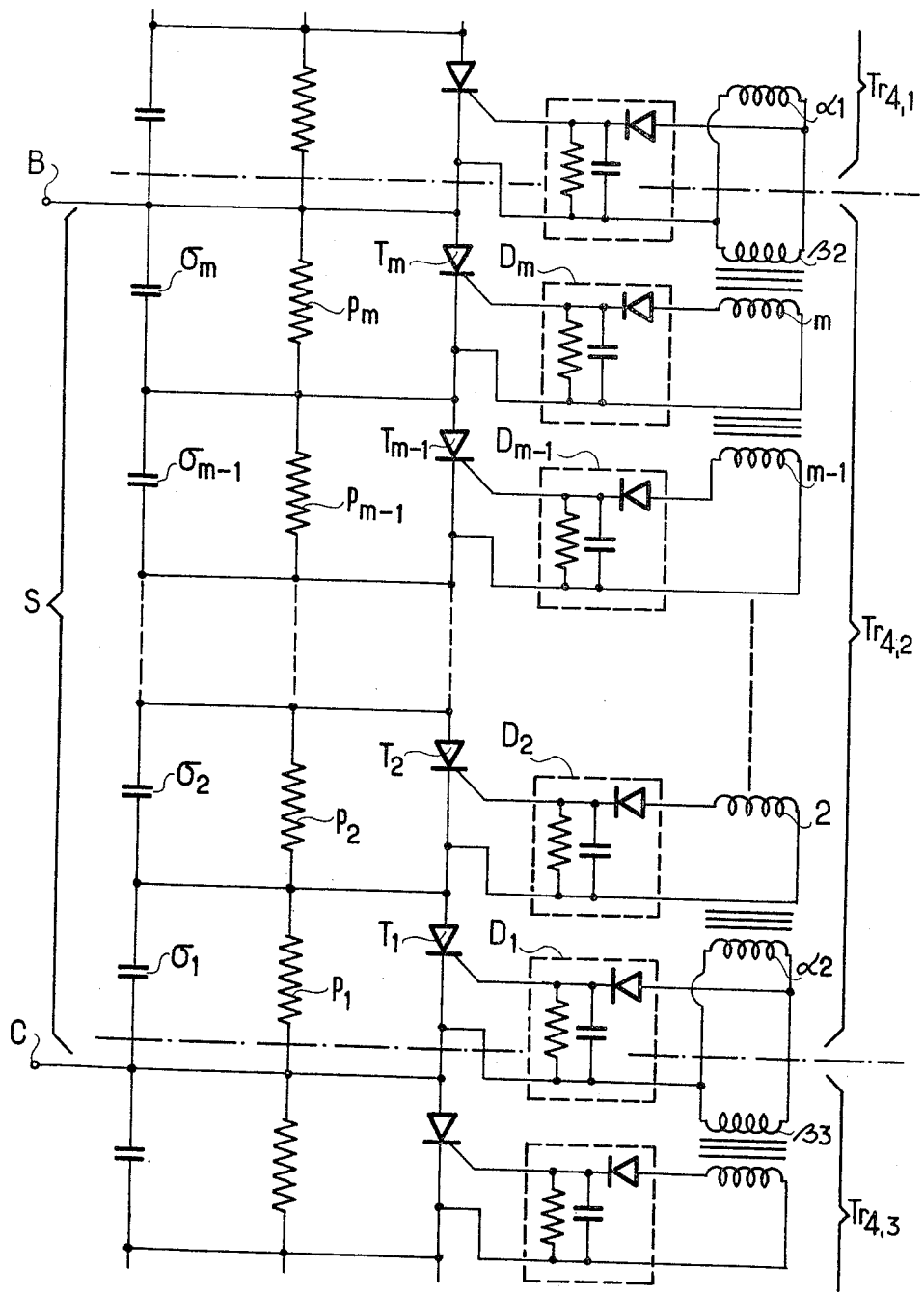
FIG. 4 is a circuit diagram illustrating the use of a transformer having multiple secondary windings for controlling the thyristors of a section.

FIG. 4 shows by way of example a variation of a transformer, such as the transformer $Tr_2$, supplying the control circuits of the thyristors $T_1, T_2 \ldots T_m$, of a section S. The primary winding $\alpha_2$, the secondary winding $\beta_2$, and the primary winding $\alpha_1$ of the transformer $Tr_{4-1}$, are identical to the primary and secondary windings of the transformers $Tr_2$ and $Tr_1$; the reference $2, 3 \ldots m$ designate respectively each of the $m-1$ identical secondary windings, different from $\beta_2$, intended for supplying the control circuits of the $m-1$ thyristors which, with the thyristor at the lowest voltage, comprise a section such as S, for instance, the thyristor $T_1$ at the lowest voltage of the section being supplied by the primary winding $\alpha_2$ of the tranformer $Tr_{4-2}$. Finally, $p_1, p_2 \ldots p_m$, designate a voltage divider composed of $m$ resistors of equal value each connected in parallel to one thyristor and $\sigma_1, \sigma_2, \sigma_3 \ldots \sigma_m$ designates a capacitive divider composed of $m$ capacitors of equal value also connected one in parallel with each of the $m$ thyristors. The insulation between the primary winding $\alpha_1$ and the secondary winding $\beta_2$ of the transformer $Tr_{4,2}$ should be the same as that of the transformers $Tr_1 \ldots Tr_{p-1}$ of FIG. 2; the insulation between two successive windings, such as $\beta_2$ and $m$, $m$ and $m-1$, $\alpha_2$ and $\beta_2$, corresponds to the voltage at the terminals of a thyristor of the section S, i.e., the voltages at the terminals of $T_m$ for $\beta_2$ and $m$, at those of $T_{m-1}$ for $m$ and $m-1 \ldots$ and at those for $\beta_2$ and $\alpha_2$.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A device for switching on a chain of series connected thyristors arranged in sections each including at least one thyristor comprising:
   an excitation transformer having a primary and a secondary winding associated with each thyristor section, said excitation transformers being connected in a chain with the primary winding of each transformer being connected in parallel with the secondary winding of the preceding transformer,
   a signal generator providing an oscillatory signal connected to the primary winding of the first transformer of said chain,
   a control source of impulses of perscribed frequency controlling the output frequency of said signal generator, the output of said signal generator being sustained for a period equal to the duration of each impulse received from said control source, and
   rectifying means connecting the secondary winding of each transformer to the control input of the thyristor in the respective section associated therewith.

2. A device as defined in claim 1 wherein said control source of impulses and said generator are connected by an isolating transformer.

3. A device as defined in claim 1 wherein said control source of pulses is a source of radiation, said generator being controlled by bursts of the radiation emitted from said source.

4. A device as defined in claim 1 wherein each section includes $m$ thryristors connected in series and each transformer has $m-1$ secondary windings, said rectifying means including a detector connecting each secondary winding to the control input of $m-1$ thyristors in each section, said rectifying means also connecting the primary winding of each transformer to the control input of the first thyristor in each section.

5. A device as defined in claim 1 wherein the signal supplied by said generator is sinusoidal.

6. A device for controlling a chain of series connected thyristors arranged in sections including at least one thyristor comprising:
   an excitation transformer having a primary and a secondary winding associated with each thyristor section, said excitation transformers being connected in a chain with the primary winding of each transformer being connected to the secondary winding of the preceding transformer,
   a signal generator providing an excitation voltage connected to the primary winding of the first transformer of said chain,
   a pilot source of pulses of prescribed frequency controlling the output frequency of said signal generator, and
   rectifying means connecting the secondary winding of each transformer to the control input of the thyristor in the respective section associated therewith,
   wherein each section includes a plurality of thyristors connected in series, each thyristor being connected in parallel with an RC circuit and with one resistor of a first voltage divider constituted of resistors of equal value in series and in number equal to the number of thyristors, said signal generator being connected to the control terminals of the first thyristor of said series connection, a second voltage divider connected in parallel to said series of thyristors and constituted of resistors of equal value in series and in number equal in value to the number or resistors of said first voltage divider, and impedance means including a Zener diode interconnecting the common points of two adjacent resistors of said first and second voltage dividers.

References Cited

FOREIGN PATENTS

| | | |
|---|---|---|
| 966,652 | 8/1964 | Great Britain. |
| 6405748 | 11/1964 | Netherlands. |

JERRY D. CRAIG, Primary Examiner